United States Patent
Vacura et al.

(10) Patent No.: US 10,254,636 B1
(45) Date of Patent: Apr. 9, 2019

(54) REDUCING HEAT GENERATED DURING PROJECTION OF VISUAL CONTENT

(71) Applicant: MOTOROLA MOBILITY LLC, Chicago, IL (US)

(72) Inventors: Daniel Vacura, Chicago, IL (US); Jason Knopsnyder, Crystal Lake, IL (US); Morris B. Bowers, Grayslake, IL (US); Martin R. Pais, North Barrington, IL (US)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 16/026,304

(22) Filed: Jul. 3, 2018

(51) Int. Cl.
  *G03B 21/16* (2006.01)
  *H04N 9/31* (2006.01)

(52) U.S. Cl.
  CPC .......... *G03B 21/16* (2013.01); *H04N 9/3105* (2013.01); *H04N 9/3135* (2013.01); *H04N 9/3144* (2013.01)

(58) Field of Classification Search
  CPC .. G03B 21/16; G03B 21/2086; G03B 21/147; G03B 21/206; G03B 21/2013; G03B 21/2033; G03B 21/2053; H04N 9/3105; H04N 9/3135; H04N 9/3144; H04N 9/315; H04N 9/3161; H04N 9/3194
  See application file for complete search history.

(56) References Cited

U.S. PATENT DOCUMENTS

| | | | |
|---|---|---|---|
| 9,104,092 B2* | 8/2015 | Nishioka | G02B 27/48 |
| 2006/0203204 A1* | 9/2006 | Yu | G03B 27/72 353/52 |
| 2007/0035706 A1* | 2/2007 | Margulis | G03B 21/20 353/122 |
| 2014/0049757 A1* | 2/2014 | Naitou | G03B 21/2053 353/86 |
| 2014/0253527 A1* | 9/2014 | Ogi | G09G 5/02 345/207 |

* cited by examiner

*Primary Examiner* — Sultan Chowdhury
(74) *Attorney, Agent, or Firm* — Yudell Isidore PLLC

(57) ABSTRACT

A method, a system, and a computer program product for reducing heat generated during projection of visual content. The method includes determining a temperature of at least one light emitter that projects a visual content based on calibration data. The method further includes determining, by a processor, whether the temperature exceeds a temperature threshold. The method further includes calculating, by the processor, at least one adjustment that reduces a level of heat generated by the at least one light emitter during projection of the visual content. The at least one adjustment overrides at least one portion of the calibration data. The method further includes applying the at least one adjustment to the at least one light emitter and modulating the at least one light emitter to project the visual content in accordance with the at least one adjustment applied to the calibration data.

20 Claims, 6 Drawing Sheets

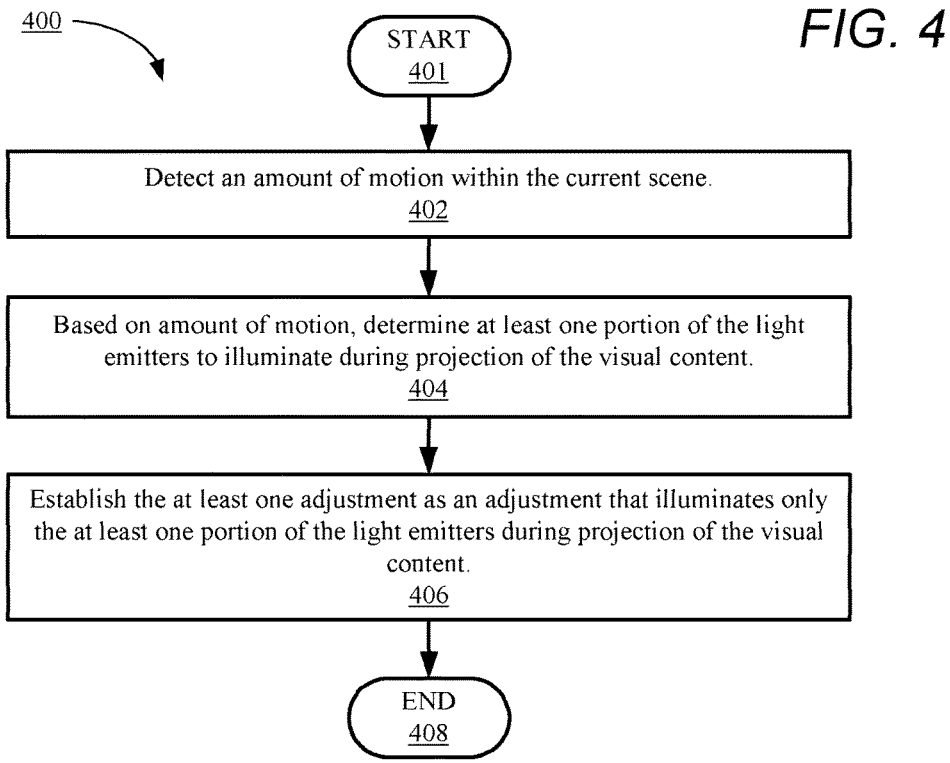
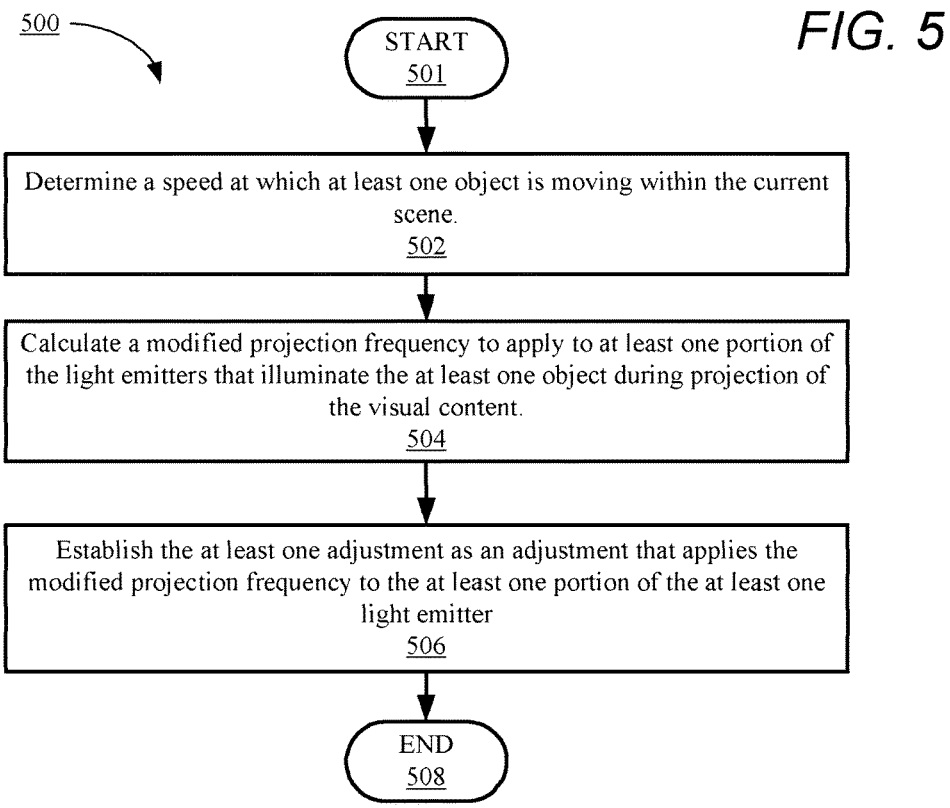

REDUCING HEAT GENERATED DURING PROJECTION OF VISUAL CONTENT

BACKGROUND

1. Technical Field

The present disclosure generally relates to electronic displays and in particular to a method for reducing a level of heat generated during projection of visual content.

2. Description of the Related Art

Many modern electronic devices include projection devices for projecting visual content onto at least one object. Projection devices include any number of light emitters which are used to project the visual content. However, many light emitters generate a substantial amount of heat as a byproduct during operation. This heat may cause the temperatures of the projection device to exceed a safe operating level, resulting in wear and/or damage to the projection device. One current solution monitors temperature levels of projection devices and increases a level of active cooling applied to the projection devices as the temperature levels rise. This solution generates additional noise, such as fan noise, which may be undesirable to a user of the electronic device or others in proximity of the electronic device. Another solution reduces a drive current to the entire projection device. However, this solution may reduce visual quality of the visual content to an undesirable level.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 4 is a flow chart illustrating a method for reducing heat generated during projection of visual content by adjusting operation of at least one light emitter of a projection device based on an amount of motion within a current scene, in accordance with one or more embodiments;

FIG. 5 is a flow chart illustrating a method for reducing heat generated during projection of visual content by adjusting operation of at least one light emitter of a projection device based on a speed of motion within a current scene, in accordance with one or more embodiments;

DETAILED DESCRIPTION

Figure 1:
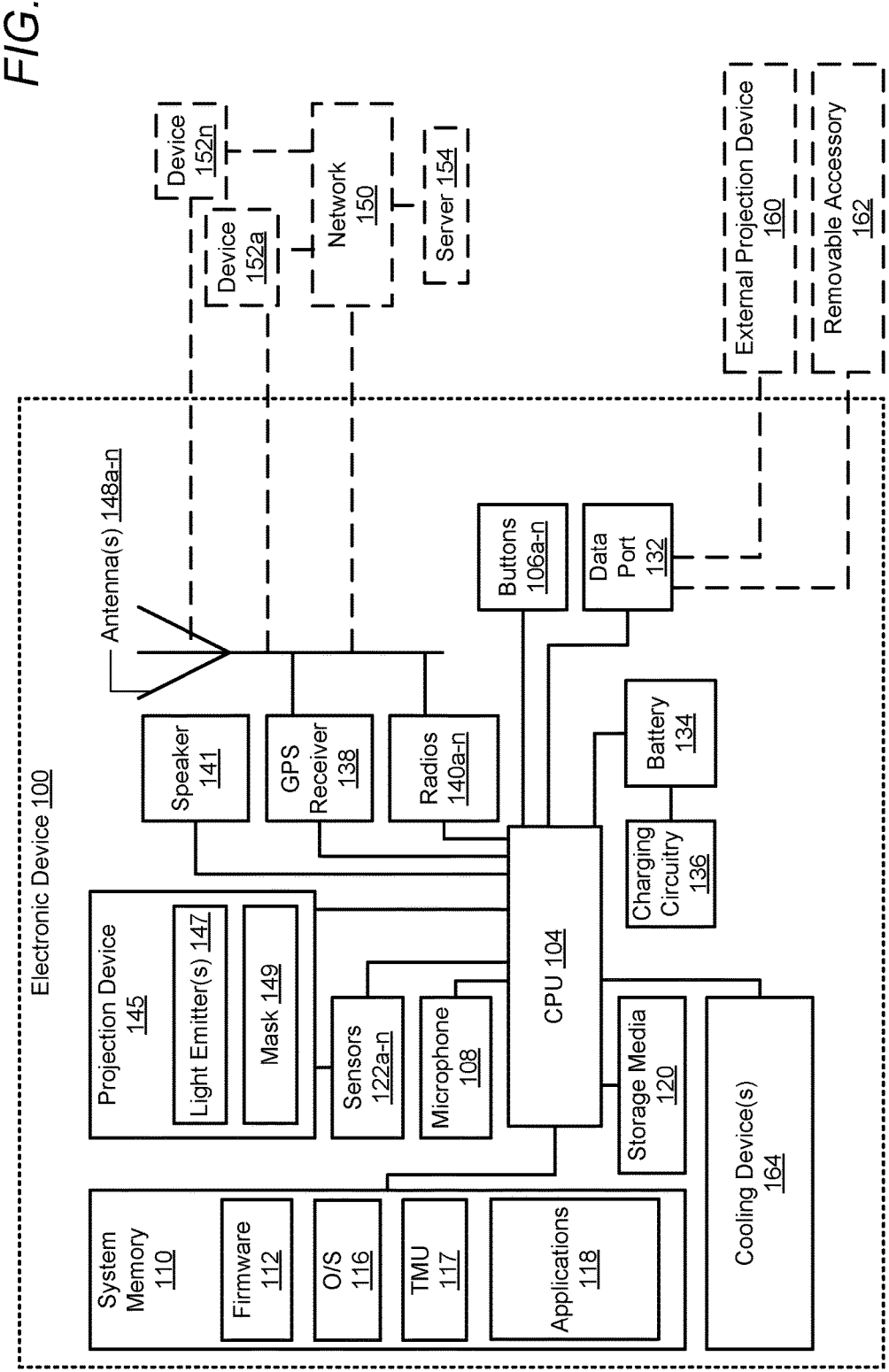
FIG. 1 illustrates an example electronic device within which certain aspects of the disclosure can be practiced, in accordance with one or more embodiments.

The illustrative embodiments provide a method, a system, and a computer program product for reducing heat generated during projection of a visual content. The method includes determining a temperature of at least one light emitter that projects visual content based in accordance with calibration data. The method further includes determining, by a processor, whether the temperature exceeds a temperature threshold. The method further includes, in response to determining the temperature exceeds the temperature threshold, calculating, by the processor, at least one adjustment that reduces a level of heat generated by the at least one light emitter during projection of the visual content. The at least one adjustment overrides at least one portion of the calibration data. The method further includes applying the at least one adjustment to the at least one light emitter and modulating the at least one light emitter to project the visual content in accordance with the at least one adjustment applied to the calibration data.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within the below described electronic device 100 (FIG. 1) are not intended to be exhaustive, but rather are representative to highlight components that can be utilized to implement the present disclosure. Other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Now turning to FIG. 1, there is illustrated an example electronic device 100 within which one or more of the described features of the various embodiments of the disclosure can be implemented. In one embodiment, electronic device 100 can be any electronic device that is equipped with a projection device (e.g., projection device 145) for projecting an image. For example, electronic device 100 may be a data processing system, an electronic video projector, a monitor, a mobile/cellular phone, or a mobile/cellular phone accessory. Electronic device 100 includes central processing unit (CPU) 104. CPU 104 may be a single CPU containing one or a plurality of cores, each of which can be capable of independent processing. In another embodiment, CPU 104 includes multiple CPUs. In another embodiment, CPU 104 may include a graphical processing unit (GPU), a general purpose graphical processing unit (GPGPU), and/or a digital signal processor (DSP). In still another embodiment, electronic device 100 includes a GPGPU and/or DSP, as separate components from CPU 104. CPU 104 is coupled to storage media 120 and system memory 110, within which firmware 112, operating system (OS) 116, temperature adjustment utility (TMU) 117, and applications 118 can be stored for execution by CPU 104. According to one aspect, TMU 117 executes within electronic device 100 to perform the various methods and functions described herein. In one or more embodiments, TMU 117 modifies/adjusts an operation of projection device 145 based on a temperature of at least one light emitter (e.g., light emitter(s) 147) within projection device 145. For example, TMU 117 may modulate a drive current, a refresh frequency/rate, and/or pulse width of light emitter(s) 147 in order to reduce a heat generated by light emitter(s) 147. For simplicity, TMU 117 is illustrated and described as a standalone or separate software/firmware/logic component, which provides the specific functions and methods described below. However, in at least one embodiment, TMU 117 may be a component of, may be combined with, or may be incorporated within firmware 112, OS 116, and/or within one or more of applications 118.

As shown, electronic device 100 may include input devices and output devices that enable a user to interface with electronic device 100. Those input devices and output devices can include microphone 108, hardware buttons 106a-n, and speaker 141. Microphone 108 may be used to receive spoken input/commands from a user. In one embodiment, microphone 108 includes multiple microphones. Hardware buttons 106a-n are selectable buttons which are used to receive manual/tactile input from a user to control specific operations of electronic device 100 and/or of applications executing thereon. In one embodiment, hardware buttons 106a-n may also include, or may be connected to, one or more sensors (e.g. a fingerprint scanner) and/or hardware buttons 106a-n may be pressure sensitive. Hardware buttons 106a-n may also be directly associated with one or more functions of a graphical user interface (not pictured) and/or functions of an OS, an application, or hardware of electronic device 100. In one embodiment, hardware buttons 106a-n may include a keyboard. Speaker 141 is used to output audio. In one embodiment, speaker 141 includes multiple speakers.

CPU 104 is also coupled to projection device 145 and sensors 122a-n. Projection device 145 comprises at least one light emitter (e.g., light emitter(s) 147) that is used to project visual content onto objects within an environment and which generates heat as a byproduct. In one embodiment, projection device 145 includes at least one internal projector of electronic device 100 that projects visual content. In another embodiment, projection device 145 includes at least one external projector 160 which is connected to electronic device 100 via a wired and/or wireless connection, such as via data port 132. In still another embodiment, projection device 145 is included within removable accessory 162, which can be physically attached to electronic device 100 and connected to CPU 104 via data port 132. CPU 104 can render a GUI (not illustrated) for viewing by projection device 145, in one embodiment. In another embodiment, a GUI can be rendered by a GPU (not illustrated). Light emitter(s) 147 can include at least one lamp/light bulb, at least one laser, at least one infrared emitter, a linear strip of LEDs, and/or a plurality or multiplicity of LEDs (such as an array of LEDs). Sensors 122a-n can include, but are not limited to including, at least one of: light sensors, infrared (IR) light sensors, thermal/temperature sensors, noise sensors, motion sensors and/or accelerometers, proximity sensors, and/or camera sensors. In one or more embodiments, at least one of light emitter(s) 147 may include one or more built-in sensors (e.g., temperature sensors).

In one embodiment, light emitter(s) 147 projects a structured light image and/or pattern within a current scene. A current scene is an area within an environment within a projection range/field of light emitter(s) 147. A current scene may include one or more objects. In one or more embodiments, the structured light image and/or pattern illuminates objects in the current scene. Distortions in the structured light image and/or pattern (such as distortions caused by a surface shape of an object) can be captured by an imaging sensor and/or light sensor. CPU 104 may analyze those distortions in the structured light image and/or pattern and determine, based on a comparison to a known pattern/design of the structured light image and/or pattern and the analysis of the distortions, a depth of a plurality of objects in the current scene. In another embodiment, light emitted from light emitter(s) 147 may pass through mask 149 having a design and/or pattern etched thereon. Thus, light from light emitter(s) 147 that passes through mask 149 may project a particular design/pattern onto one or more objects in current scene based on the design and/or pattern of mask 149. In another embodiment, light emitter(s) 147 are moved and/or scanned in a predetermined pattern during projection to project an image and/or pattern across at least one object in a current scene. In still another embodiment, light emitter(s) 147 project a visual content that includes text, media content, including images and video, and/or a graphical user interface (GUI) associated with or generated by firmware and/or one or more applications executing on electronic device 100. It should be noted that in some embodiments the visual content projected by light emitter(s) 147 contains light (e.g., infrared light) in a visual spectrum that can be detected/captured by an imaging sensor, but that may not be visible to the naked eye.

As shown, electronic device 100 also includes cooling device(s) 164. In one embodiment, cooling device(s) 164 include at least one passive cooling device for dissipating heat generated by at least one heat-generating component of electronic device 100 to an environment of electronic device 100. Passive cooling devices may include a heat sink, for example. In another embodiment, cooling device(s) 164 includes at least one active cooling device that is used to cool at least one heat-generating component of electronic device 100 and transfer heat generated by the at least one component to a surrounding environment, external to electronic device 100. Active cooling devices can include, but are not limited to: thermoelectric cooling devices, electromagnetic cooling devices, oscillatory cooling devices, forced liquid cooling devices, and/or forced air/gas cooling devices, such as radial/rotary fans and blowers. Active cooling devices can include motors and/or moving components that generate air-based noise and/or mechanical/vibrational noise which may be audible to a user of electronic device 100.

Electronic device 100 also includes data port 132 (e.g., a universal serial bus (USB) port), battery 134, and charging circuitry 136. Data port 132 can operate as a charging port that receives power via an external charging device (not pictured) for charging battery 134 via charging circuitry 136. Data port 132 can operate as a charging port that provides power to an external device that is connected to data port 132 for charging a battery (not pictured) of the external device via charging circuitry 136. Battery 134 may include a single battery or multiple batteries for providing power to components of electronic device 100. In at least one embodiment, battery 134 includes at least one battery that is removable and/or replaceable by an end user. In another embodiment, battery 134 includes at least one battery that is permanently secured within/to electronic device 100. Data port 132 may also function as one of an input port, an output port, and a combination input/output port.

Electronic device 100 may also include global positioning satellite (GPS) receiver 138 and one or more wireless radios 140a-n. GPS 138 may be coupled to at least one of antenna(s) 148a-n to enable electronic device 100 to determine its current location and/or rate of travel. Wireless radios 140a-n may be coupled to one or more of antenna(s) 148a-n to enable electronic device 100 to wirelessly connect to, and transmit and receive voice and/or data communication to/from, one or more other devices, such as devices 152a-n and server 154. As a wireless device, device 100 can transmit data over a wireless network 150 (e.g., a Wi-Fi network, a cellular network, a Bluetooth® network (including Bluetooth® low energy (BLE) networks), a wireless ad hoc network (WANET), or a personal area network (PAN)). In one embodiment, wireless radios 140a-n may include a short-range wireless device, including, but not limited to, a near field communication (NFC) device. In one embodiment, electronic device 100 may be further equipped with an infrared (IR) device (not pictured) for communicating with other devices using an IR connection. In another embodiment, electronic device 100 may communicate with one or more other device(s) using a wired or wireless USB connection.

Figure 2:
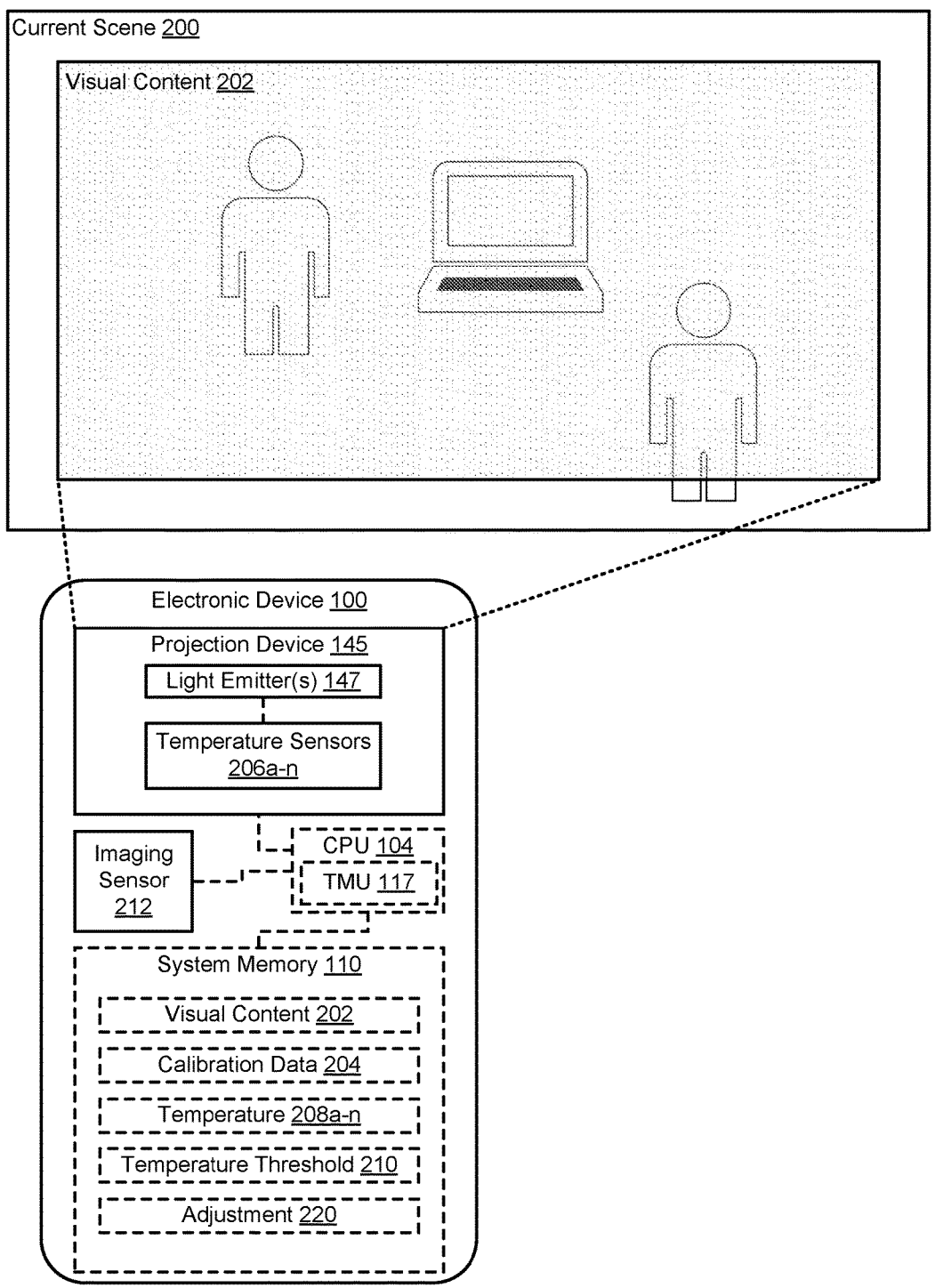
FIG. 2 illustrates another example electronic device, in accordance with one or more embodiments.

FIG. 2 is a block diagram illustrating additional functional components within example electronic device 100, in accordance with one or more embodiments of the present disclosure. Electronic device 100 can also include at least one of the components described in FIG. 1. As illustrated, electronic device 100 includes CPU 104, which executes TMU 117. Electronic device 100 also includes system memory 110, temperature sensors 206a-n, and projection device 145. Light emitter(s) 147 emit light used by projection device 145 to project/display visual content 202. Projection device 145 projects visual content 202, (e.g., a structured light image and/or pattern, an illuminated mask, an image, a video, and/or a user interface/GUI) within current scene 200 by light emitter(s) 147. In one or more embodiments, light emitter(s) 147 emit light in accordance with calibration data 204. Calibration data 204 establishes operational settings for light emitter(s) 147 and/or projection device 145. In one or more embodiments, calibration data 204 establishes default settings/parameters for light emitter(s) 147 and/or projection device 145. For example, calibration data 204 can establish a default brightness of light emitter(s) 147. Calibration data 204 can also establish a refresh frequency, a drive current, and/or pulse width to be applied to light emitter(s) 147 during projection of visual content 202. Electronic device 100 may optionally be configured with at least one imaging sensor 212, which can include light sensors, infrared sensors, and/or camera sensors.

During projection of visual content 202, light emitter(s) 147 generate heat as a byproduct. In one embodiment, heat generated by light emitter(s) 147 is measured and/or tracked in real time by temperature sensors 206a-n. Temperature sensors 206a-n can be attached to or placed adjacent to light emitter(s) 147 in order to measure and/or track a change in temperature of a light emitter that is in close proximity in real-time. In another embodiment, at least one of light emitter(s) 147 may contain at least one built-in temperature sensor 206a-n. In another embodiment, temperature sensors 206a-n may include at least one sensor that is attached to a surface of electronic device 100. In one embodiment, light emitter(s) 147 include a single light source (e.g., a light bulb). In another embodiment, light emitter(s) 147 include a plurality of light sources, such as a vertical cavity surface emitting laser (VCSEL) array and/or an array of LEDs. In the embodiment in which light emitter(s) 147 include a plurality of light sources, the heat generated by each of light emitter(s) 147 does not necessarily disperse evenly across the plurality of light sources. In this embodiment, CPU 104 may measure different temperature measurements at different points along the plurality of light sources. For example, in an embodiment in which light emitter(s) 147 include an LED array, temperature sensors 206a-n may include a plurality of temperature sensors 206a-n that are strategically placed across the LED array in order to detect the temperature at each of a plurality of locations within the LED array. For example, within the LED array a temperature sensor may be placed between every two light emitters. Thus, any hot spots and/or cool spots within the LED array can be detected. In another embodiment, projection device 145 includes a dedicated temperature sensor 206 for each of light emitter(s) 147. CPU 104 receives temperature 208a-n from each of temperature sensors 206a-n. In one or more embodiments, a level of heat generated by light emitter(s) 147 increases as (1) a drive current applied to light emitter(s) 147 increases, (2) a refresh frequency of light emitter(s) 147 increases, and/or (3) as a pulse width applied to light emitter(s) 147 increases.

Temperature 208a is a measurement of a real-time temperature of a component or region within light emitter(s) 147 and/or projection device 145. In one embodiment, each temperature 208a-n received corresponds to a specific light emitter from among light emitter(s) 147. In another embodiment, temperature 208a-n measures a real-time temperature at a particular location, such as a particular location within a LED array that is adjacent to multiple light emitters. In another embodiment, temperature 208a-n represents an estimated temperature of light emitter(s) 147. CPU 104 estimates a temperature of light emitter(s) 147 based on an operating mode of projection device 145 and/or light emitter(s) 147. For example, CPU 104 can estimate temperature 208a-n based on a brightness level/setting of light emitter(s) 147. CPU 104 can further estimate temperature 208a-n based on an operating mode of one or more other components of electronic device 100. For example, CPU 104 can further estimate temperature 208a-n based on a brightness level/setting of light emitter(s) 147 and/or a measured and/or estimated clock speed of CPU 104. In one or more embodiments, CPU 104 tracks changes in temperature 208a-n over time in order to determine a rate of change of heat generated by light emitter(s) 147. Adjustment 220 may be calculated based in part on the rate of change of heat generated by emitter(s) 147, as described in greater detail below.

When temperature 208a-n exceeds temperature threshold 210, heat generated by light emitter(s) 147 and/or other components of electronic device 100 may cause damage to and/or shorten the expected operational life of light emitter(s) 147, projection device 145, and/or other components of electronic device 100. In one or more embodiments, temperature threshold 210 is a pre-determined/preset value, such as an upper temperature threshold value established by a manufacturer. In another embodiment, temperature threshold 210 is a predetermined temperature range. In one or more embodiments, CPU 104 determines whether temperature 208a-n meets and/or exceeds temperature threshold 210. In some embodiments, CPU 104 receives multiple values associated with temperature 208a-n. In one embodiment, in determining whether temperature 208a-n meets and/or exceeds temperature threshold 210, CPU 104 determines whether any of the received values of temperature 208a-n meet and/or exceed temperature threshold 210. In another embodiment, in determining whether temperature 208a-n meets and/or exceeds temperature threshold 210, CPU 104 determines whether an average/mean of temperatures 208a-n meet and/or exceed temperature threshold 210. In another embodiment, in determining whether temperature 208a-n meets and/or exceeds temperature threshold 210, CPU 104 determines whether particular ones of temperature 208a-n meet and/or exceed temperature threshold 210. In response to determining that temperature 208a-n meets and/or exceeds temperature threshold 210, CPU 104 calculates adjustment 220 for light emitter(s) 147. The calculated adjustment overrides one or more settings/parameters for light emitter(s) 147 that are established within calibration data 204. It should be noted that adjustment 220 may only override specific (but not all) settings/parameters established within calibration data 204. In one or more embodiments, in response to calculating adjustment 220, CPU 104 modulates light emitter(s) 147 to project visual content 202 in accordance with adjustment 220 applied to calibration data 204.

In one or more embodiments, adjustment 220 is calculated by CPU 104 to modify an intensity of light emitter(s) 147 based on temperature 208a-n in order to reduce heat generated by light emitter(s) 147. Adjustment 220 mitigates negative effects caused by the heat generated by light emitter(s) 147 and/or projection device 145. In one embodiment, adjustment 220 is calculated by CPU 104 to reduce temperature 208a-n to a value that is below temperature threshold 210. In another embodiment, adjustment 220 is calculated by CPU 104 to ensure that an operating temperature of at least one of light emitter(s) 147 is within a predetermined safe thermal operating range. For example, adjustment 220 can establish a modified brightness of light emitter(s) 147. Adjustment 220 can also establish a modification to at least one of the refresh frequency, the drive current, and/or the pulse width for light emitter(s) 147.

In another embodiment, adjustment 220 is calculated by CPU 104 to modify an intensity of light emitter(s) 147 based on an amount of motion and/or degree of movement of at least one object within current scene 200. In this embodiment, electronic device 100 includes imaging sensor 212 which is a light sensor that is utilized to capture visual content 202 (e.g., a structured light pattern) while current scene 200 is illuminated with visual content 202. In one or more embodiments, CPU 104 analyzes distortions (e.g., distortions caused by a surface shape of an object) in visual content 202 as captured by imaging sensor 212. Based on a known pattern/design of visual content 202 (as provided within system memory 110) and the analysis of the distortions, CPU 104 determines a speed/rate of movement of objects in current scene 200. Adjustment 220 is calculated by CPU 104 to modify an intensity of light emitter(s) 147 that illuminate at least one object during projection of the visual content 202 based on the rate of movement in current scene. For example, adjustment 220 can reduce a refresh frequency of light emitter(s) 147 to a particular level (e.g., 15 Hz refresh) when CPU 104 determines that current scene 200 has a low level of movement (e.g., slow movement or no-movement). In another example, CPU 104 can establish a refresh frequency and/or of light emitter(s) 147 to an optimal level based on the detected speed/rate of movement of objects in current scene 200 (e.g., 60 Hz for high motion objects). CPU 104 can also calculate adjustment 220 that modifies the drive current and/or the pulse width for light emitter(s) 147. It should be known that adjustment 220 may include decreases and/or increases to parameters/settings established by calibration data 204. For example, adjustment 220 can include an increase to a refresh rate of light emitter(s) 147 and also include a decrease to a drive current and a pulse width applied to light emitter(s) 147. In another embodiment, CPU 104 may calculate adjustment 220 that places light emitter(s) 147 into a sleep mode and/or low power mode in response to determining there is no motion in current scene 200.

In an embodiment where light emitter(s) 147 include a plurality of light emitter(s) 147 (e.g., a LED array) and electronic device 100 includes imaging sensor 212 (such as an infrared light sensor for capturing a structured light image), CPU 104 may calculate, based on the detected amount of motion, adjustment 220 which enables and/or disables individual ones of the plurality of light emitters. That is, CPU 104 calculates adjustment 220 to enable/activate only at least one particular portion of the plurality of light emitters and/or to disable/deactivate at least one other portion of the plurality of light emitter(s) 147. For example, in response to determining from imaging sensor 212 that motion is only detected within the right side of current scene 200, CPU 104 can calculate adjustment 220 that enables/activates only the portion of the plurality of light emitters that illuminates the same (right) side of current scene during projection of the visual content and/or that disables/de-activates another portion of the plurality of light emitters that illuminates another portion (e.g., the left side) of current scene. By reducing the number of light emitters that are illuminating current scene 200, a level of heat generated by light emitters 147 is also reduced. Thus, during the projection of visual content 202, only those particular portions of current scene 200 having activity/movement are illuminated by light emitters 147.

In another embodiment in which light emitter(s) 147 include a plurality of light emitter(s) 147 (e.g., a LED array) and electronic device 100 includes at least one imaging sensor (e.g., imaging sensor 212) that is a light sensor, CPU 104 captures images within current scene 200 while current scene 200 is illuminated with visual content 202 by light emitter(s) 147. In one or more embodiments, CPU 104 analyzes the captured images to calculate a distance to at least one object. Based on a known pattern/design of visual content 202 and the analysis of the captured images, CPU 104 calculates a distance between electronic device 100 and the at least one object. Based on the calculated distance to the at least one object, CPU 104 calculates adjustment 220, which includes at least one modification to a setting/parameter of calibration data 204 for illuminating at least one particular object during projection of visual content 202. For example, adjustment 220 can include a modified level of drive current for at least one portion of light emitter(s) 147 that ensures that the at least one portion of light emitter(s) 147 illuminates the at least one object during projection of visual content 202. In this embodiment, adjustment 220 can also include a reduced level of drive current for a remaining portion of light emitter(s) 147 that do not illuminate the at least one object during projection of visual content 202. Thus, adjustment 220 can include both (1) a first set of adjustments that increases a drive current for a first portion of the light emitters that illuminate the at least one object and (2) a second set of adjustments that decreases a drive current for a remaining portion of the light emitters that do not illuminate the at least one object. CPU 104 can also continue to analyze captured images in order to determine when a distance between electronic device 100 and the at least one object has changed from a previously measured distance. CPU 104 may further modify adjustment 220 based on a detected change in the distance to at least one of the objects.

In another embodiment, CPU 104 measures a level of ambient light within an environment of electronic device 100 by a light sensor (e.g., imaging sensor 212). Based on the measured level of ambient light, CPU 104 establishes, within adjustment 220, a modification to an operating parameter setting of light emitter(s) 147 (e.g., a modified level of drive current) to be applied to at least one portion of light emitter(s) 147 during projection of visual content 202. For example, when the measured level of ambient light exceeds a certain brightness threshold, CPU 104 can establish, within adjustment 220, an increase to a level of drive current. The increased level of drive current is applied to at least one portion of light emitter(s) 147 to increase a brightness of visual content 202. In another example, the measured level of ambient light is below a certain darkness threshold. CPU 104 establishes, within adjustment 220, a decrease to a value of the drive current that is applied to at least one portion of light emitter(s) 147. The decrease to the value of the drive current correspondingly decreases brightness of visual content 202. In another embodiment, based on a measured ambient light level, CPU 104 calculates adjustment 220 which enables/activates only a portion of the plurality of light emitters (and/or disables another portion of the plurality of light emitters). CPU 104 can additionally or alternatively calculate adjustment 220 which modifies a drive current, refresh frequency, and/or pulse width applied to that portion of the plurality of light emitters.

In response to calculating adjustment 220, CPU 104 applies adjustment 220 to light emitter(s) 147 and/or projection device 145. By applying adjustment 220 to light emitter(s) 147 and/or projection device 145, heat generated by light emitter(s) 147 is reduced which may prolong the operational life of light emitter(s) 147 and/or projection device 145 and/or negate negative effects caused by the heat generated by light emitter(s) 147. In one or more embodiments, CPU 104 applies adjustment 220 to projection device 145 and/or light emitter(s) 147 during projection of visual content 202 by projection device 145 without interruption to the visual content 202 that is already being rendered by projection device 145.

In another embodiment, system memory 110 includes one or more applications (e.g., applications 118 of FIG. 1) that perform intensive processing on CPU 104 during projection of visual content 202 by light emitter(s) 147. During operation, these applications may cause an increasing in processing performed by CPU 104 which generates additional heat as a byproduct. If these applications are executing/operating during a time period when light emitter(s) 147 are also operational, electronic device can experience a significant increase in heat generated as a byproduct by CPU 104, projection device 145, light emitter(s) 147, and/or other components of electronic device 100. In one or more embodiments, CPU 104 can delay processing by those applications until a time after the projection of visual content 202 by light emitter(s) 147 has concluded, thus reducing a level of heat generated during a time period when light emitter(s) 147 are operational. In one embodiment, imaging sensor 212 includes at least one camera sensor that captures a plurality of images during projection of the visual content.

In this embodiment, the plurality of images captured by imaging sensor 212 are captured as electronic device 100 rotates around an object. An application (e.g., applications 118) of electronic device 100 is configured to collectively process the plurality of images captured by imaging sensor 212 to generate a composite image, such as a three-dimensional (3D) image. In this embodiment, CPU 104 can determine whether temperature 208a-n meets or exceeds temperature threshold 210. In response to determining temperature 208a-n meets or exceeds temperature threshold 210, CPU 104 can delay a scheduled processing of the plurality of images by imaging sensor 212 and/or CPU 104 until a time after the projection of visual content 202 by light emitter(s) 147 has concluded. In response to determining projection of the visual content 202 by light emitter(s) 147 has concluded, CPU 104 may then initiate and/or resume processing of the plurality of images to generate the composite image.

In one or more embodiments, during time periods when temperature 208a-n does not meet and/or exceeds temperature threshold 210, CPU 104 monitors conditions within current scene 200 in which projection device 145 is projecting visual content 202 and/or within an environment of electronic device 100. In one embodiment, during this time period, CPU 104 monitors the environment of electronic device 100 for changes in the ambient light level via imaging sensor 212. In another embodiment, during this time period, CPU 104 monitors current scene 200 for changes in the speed of motion of at least one object. In another embodiment, during this time period, CPU 104 monitors current scene 200 changes in distance between electronic device 100 and at least one object. In response to detecting changes in the environment and/or the current scene, CPU 104 can calculate adjustments 220 that correct the operating mode of light emitter(s) 147 to adjust for the changes. For example, CPU 104 may calculate additional adjustments to a refresh frequency, a drive current, and/or a pulse width of the at least one light emitter(s) 147 based on the detected changes.

Referring now to FIGS. 3-8, aspects of the methods are described with reference to the components of FIGS. 1-2. Several of the processes of the methods provided in FIGS. 3-8 can be implemented by a processor (e.g., CPU 104) executing software code (i.e., program instructions) of TMU 117 within a device (e.g., electronic device 100). The method processes described in FIGS. 3-8 are generally described as being performed by components of electronic device 100.

Figure 3:
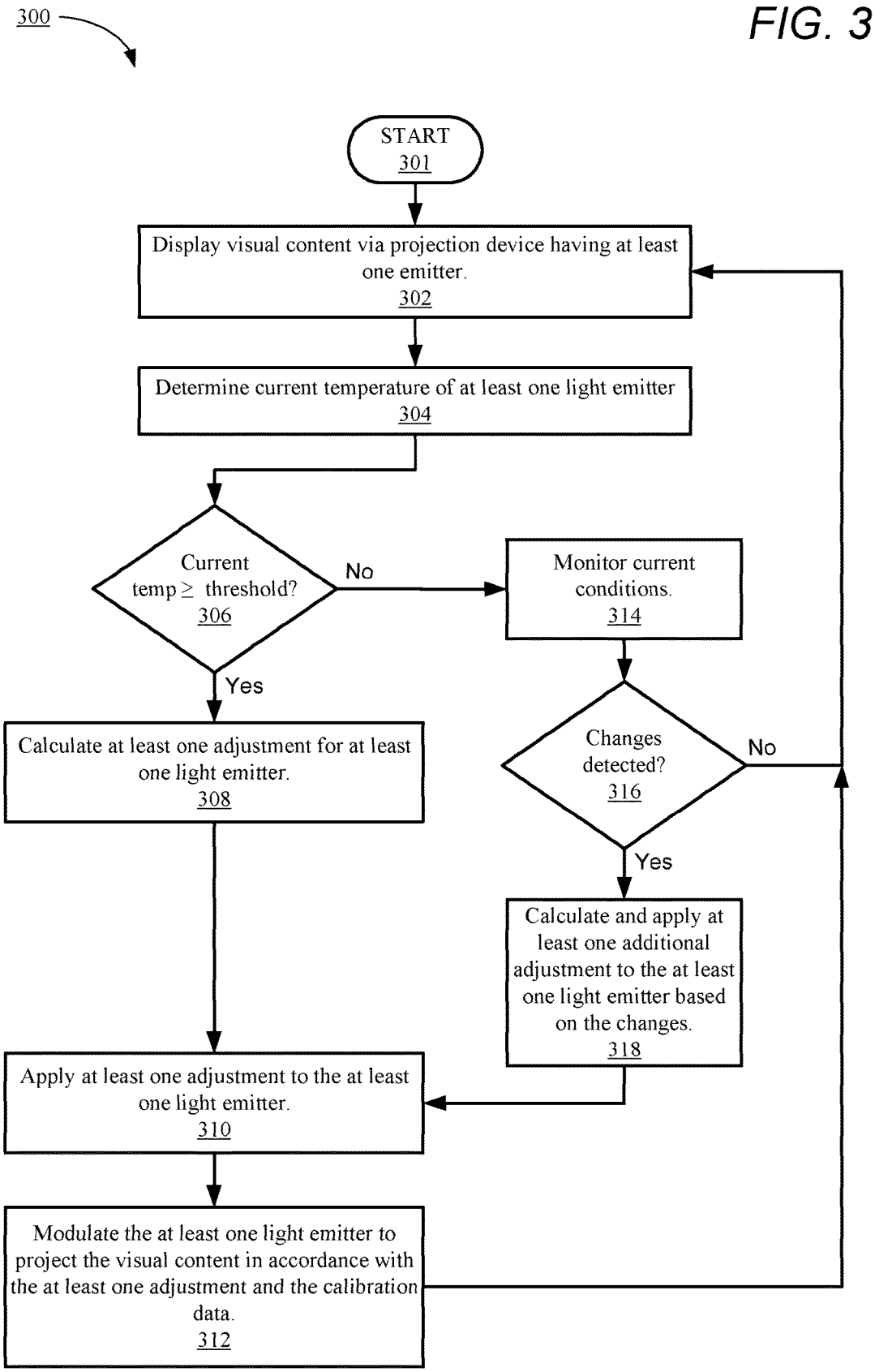
FIG. 3 is a flow chart illustrating a method for reducing heat generated during projection of visual content, in accordance with one embodiment of the present disclosure.

Referring now to FIG. 3, there is depicted a flow chart illustrating a method for reducing heat generated during projection of visual content, in accordance with one or more embodiments of the present disclosure. Method 300 commences at initiator block 301 then proceeds to block 302. At block 302, CPU 104 displays visual content (e.g., visual content 202) via a projection device (e.g., projection device 145) having at least one emitter (e.g., emitter 147). At block 304, CPU 104 determines a temperature (temperature 208a-n). In one embodiment, CPU 104 estimates the temperature based on a current operating mode of projection device 145 and/or light emitter(s) 147. In another embodiment, CPU 104 measures the temperature by at least one temperature sensor (e.g., temperature sensors 206a-n). At block 306, CPU 104 determines whether the temperature meets or exceeds at least one predetermined temperature threshold (e.g., temperature threshold 210). In response to determining at block 306 that the temperature meets or exceeds the at least one predetermined temperature threshold, method 300 continues to block 308.

At block 308, CPU 104 calculates, for the at least one light emitter, at least one adjustment (e.g., adjustment 220) that reduces a level of heat generated by the at least one light emitter during projection of the visual content and which overrides at least one portion of the calibration data (e.g., calibration data 304). At block 310, CPU 104 applies the at least one adjustment to the calibration data of at least one light emitter. According to one embodiment, any adjustments contained within the at least one adjustment overrides any corresponding preset/default settings in the calibration data. At block 312, CPU 104 modulates the at least one light emitter to project the visual content in accordance with the at least one adjustment applied to the calibration data. Method 300 then returns to block 302.

In response to determining at block 306 that the temperature does not meet or exceed the at least one predetermined temperature threshold, method 300 continues to block 314. At block 314, CPU 104 monitors conditions within the current scene and/or environment of electronic device 100 for changes. For example, CPU 104 may monitor ambient light levels within the environment, a level or speed of motion objects in the current scene, and/or a distance to objects in the current scene. At block 316, CPU 104 determines whether changes are detected. In response to determining there are no changes to current conditions, method 300 returns to block 302. In response to determining there are changes to current conditions, CPU 104 calculates, for the at least one emitter, at least one adjustment (adjustment 220) to compensate for the detected changes detected within the current scene (block 318). Method 300 then includes applying the at least one adjustment to the at least one emitter to compensate for the changes detected (block 310). Method 300 then continues back to block 302.

Referring now to FIG. 4, there is depicted a flow chart illustrating a method for reducing heat generated during projection of a visual content by adjusting operation of at least one light emitter of a projection device based on an amount of motion within a current scene, in accordance with one or more embodiments of the present disclosure. In one or more embodiments, the features and/or functionality provided by method 400 may be performed at steps 308-310 and/or 318 of method 300 (as described in FIG. 3). Method 400 commences at initiator block 401 then proceeds to block 402. At block 402, CPU 104 detects an amount of motion in the current scene. In one or more embodiments, at least one imaging sensor (e.g., imaging sensor 212) captures images while the current scene is illuminated with the visual content. CPU 104 analyzes distortions in the captured visual content and determines an amount of motion by the objects in current scene 200, based on a known pattern/design of the visual content and the movement of the distortions within the scene. At block 404, CPU 104 determines, based on the amount of motion in the current scene, at least one portion of the light emitters (light emitter(s) 147) to illuminate during projection of the visual content. In one embodiment, the at least one portion of the light emitters selected are the light emitters that illuminate the portion of the current scene in which the objects are in motion. In one embodiment, the other emitters that illuminate a portion of the current scene containing objects that are not in motion during projection of the visual content are not illuminated. At block 406, CPU 104 establishes at least one adjustment (e.g., adjustment 220) that causes the illumination of only the at least one portion of the (selected) light emitters during projection of the visual content. Method 400 then ends at block 408.

Referring now to FIG. 5, there is depicted a flow chart illustrating a method for reducing heat generated during projection of a visual content by adjusting operation of at least one light emitter of a projection device based on a speed of motion within a current scene, in accordance with one or more embodiments of the present disclosure. In one or more embodiments, the features and/or functionality provided by method 500 may be performed at steps 308-310 and/or 318 of method 300 (as described in FIG. 3, above). Method 500 commences at initiator block 501 then proceeds to block 502.

At block 502, CPU 104 detects a speed at which at least one object is moving within the current scene. In one or more embodiments, at least one imaging sensor (e.g., imaging sensor 212) captures images of visual content projected by a projection device while the current scene is illuminated with the visual content. CPU 104 analyzes distortions in the captured visual content and determines a speed/rate of movement of objects in current scene 200 based on a known pattern/design of the visual content and the analysis of the distortions. At block 504, CPU 104 calculates a modified projection frequency to apply to at least one portion of light emitters (e.g., light emitter(s) 147). The at least one portion are those light emitters that illuminate the at least one object during projection of the visual content. In one embodiment, the modified projection frequency is not applied to other emitters that do not illuminate the at least one object during projection of the visual content. At block 506, CPU 104 establishes at least one adjustment (e.g., adjustment 220) that modifies the projection frequency of the at least one portion of the light emitters during projection of the visual content. Method 500 then ends at block 508.

Figure 6:
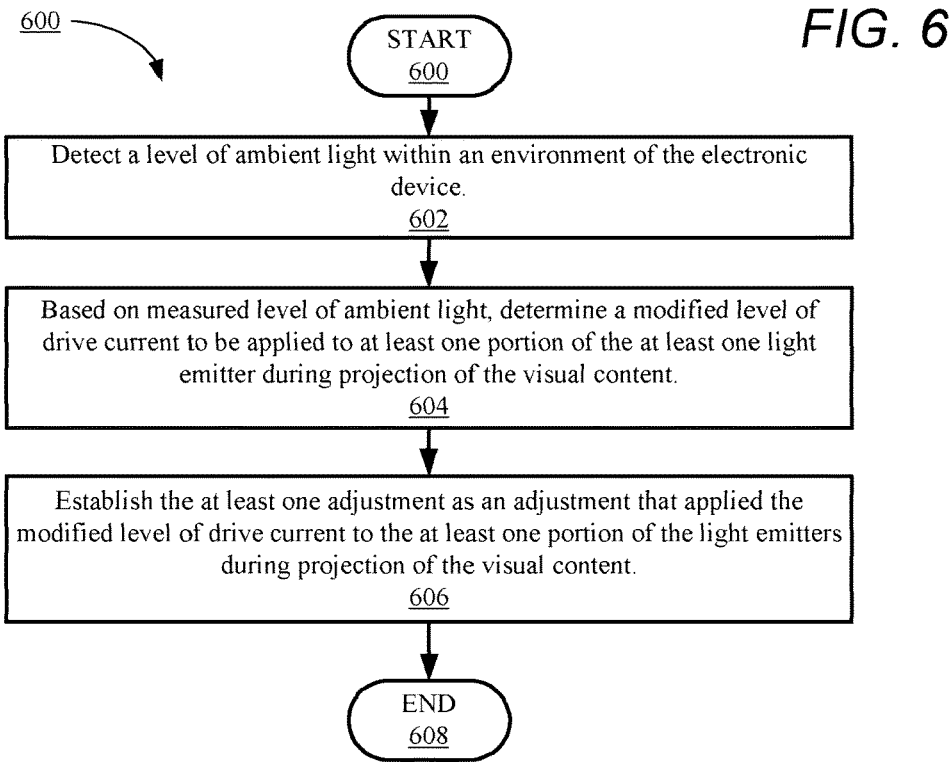
FIG. 6 is a flow chart illustrating a method for reducing heat generated during projection of visual content by adjusting operation of at least one light emitter of a projection device based on an amount of ambient light within an environment of an electronic device, in accordance with one or more embodiments.

Referring now to FIG. 6, there is depicted a flow chart illustrating a method for reducing heat generated during projection of a visual content by adjusting operation of at least one light emitter of a projection device based on an amount of ambient light within an environment of an electronic device, in accordance with one or more embodiments of the present disclosure. In one or more embodiments, the features and/or functionality provided by method 600 may be performed at steps 308-310 and/or 318 of method 300 (as described in FIG. 3). Method 600 commences at initiator block 601, then proceeds to block 602. At block 602, a level of ambient light within the environment of the electronic device is detected by a light sensor (e.g., imaging sensor 212). At block 604, CPU 104 determines, based on the measured level of ambient light, a modified level of drive current to apply to at least one portion of the at least one emitter (e.g., light emitter(s) 147) during projection of the visual content. The modified level of drive current may be an increase or decrease to a drive current that is currently being applied to the at least one emitter. At block 606, CPU 104 establishes at least one adjustment (e.g., adjustment 220) that modifies the drive current for the at least one emitter to the modified level of drive current during projection of the visual content. Method 600 then ends at block 608.

Figure 7:
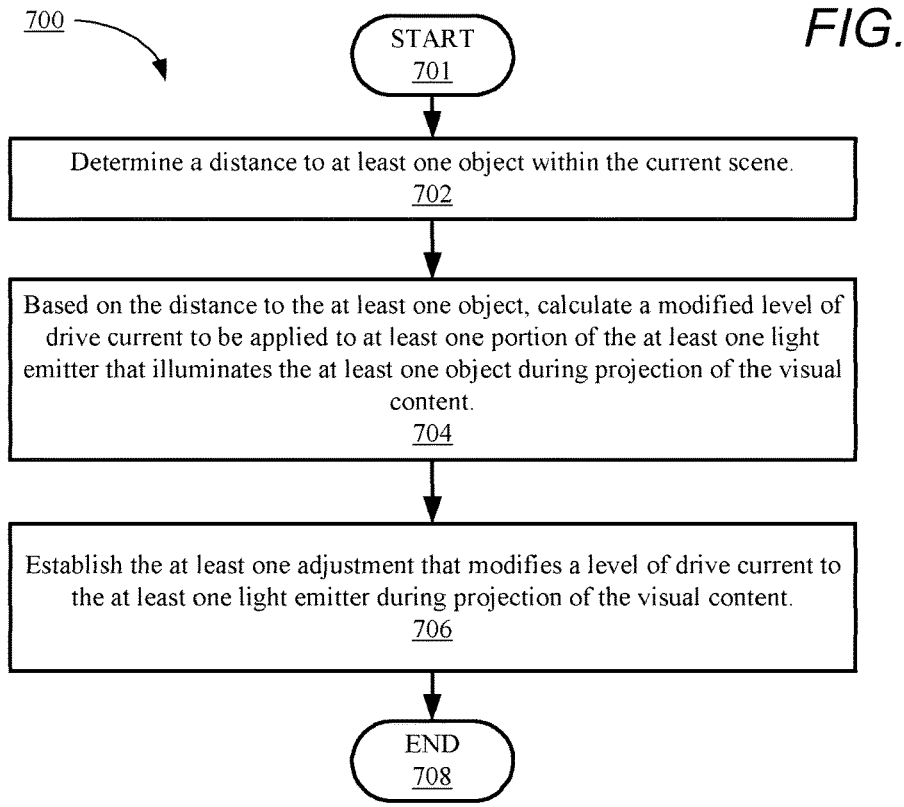
FIG. 7 is a flow chart illustrating a method for reducing heat generated during projection of visual content by adjusting operation of at least one light emitter of a projection device based on a distance to at least one object within a current scene, in accordance with one or more embodiments.

Referring now to FIG. 7, there is depicted a flow chart illustrating a method for reducing heat generated during projection of visual content by adjusting operation of at least one light emitter of a projection device based on a distance between an electronic device and at least one object within a current scene, in accordance with one or more embodiments of the present disclosure. In one or more embodiments, the features and/or functionality provided by method 700 may be performed at steps 308-310 and/or 318 of method 300 (as described in FIG. 3). Method 700 commences at initiator block 701 then proceeds to block 702. At block 702, CPU 104 determines a distance between an electronic device and at least one object in the current scene. In one or more embodiments, at least one imaging sensor (e.g., imaging sensor 212) detects and conveys images to CPU 104 while the current scene is illuminated with the visual content. CPU 104 analyzes distortions in the captured images to determine a distance between the electronic device and objects in current scene 200, based on a known pattern/design of the visual content and the distortions within the scene. At block 704, CPU 104 calculates, based on the determined distance to the at least one object, a modified level of drive current to apply to at least one portion of the at least one emitter (e.g., light emitter(s) 147) to ensure that the at least one emitter illuminates the at least one object during projection of the visual content. At block 706, CPU 104 establishes at least one adjustment (e.g., adjustment 220) that modifies the drive current for the at least one emitter to the modified level of drive current during projection of the visual content. Method 700 then ends at block 708.

Figure 8:
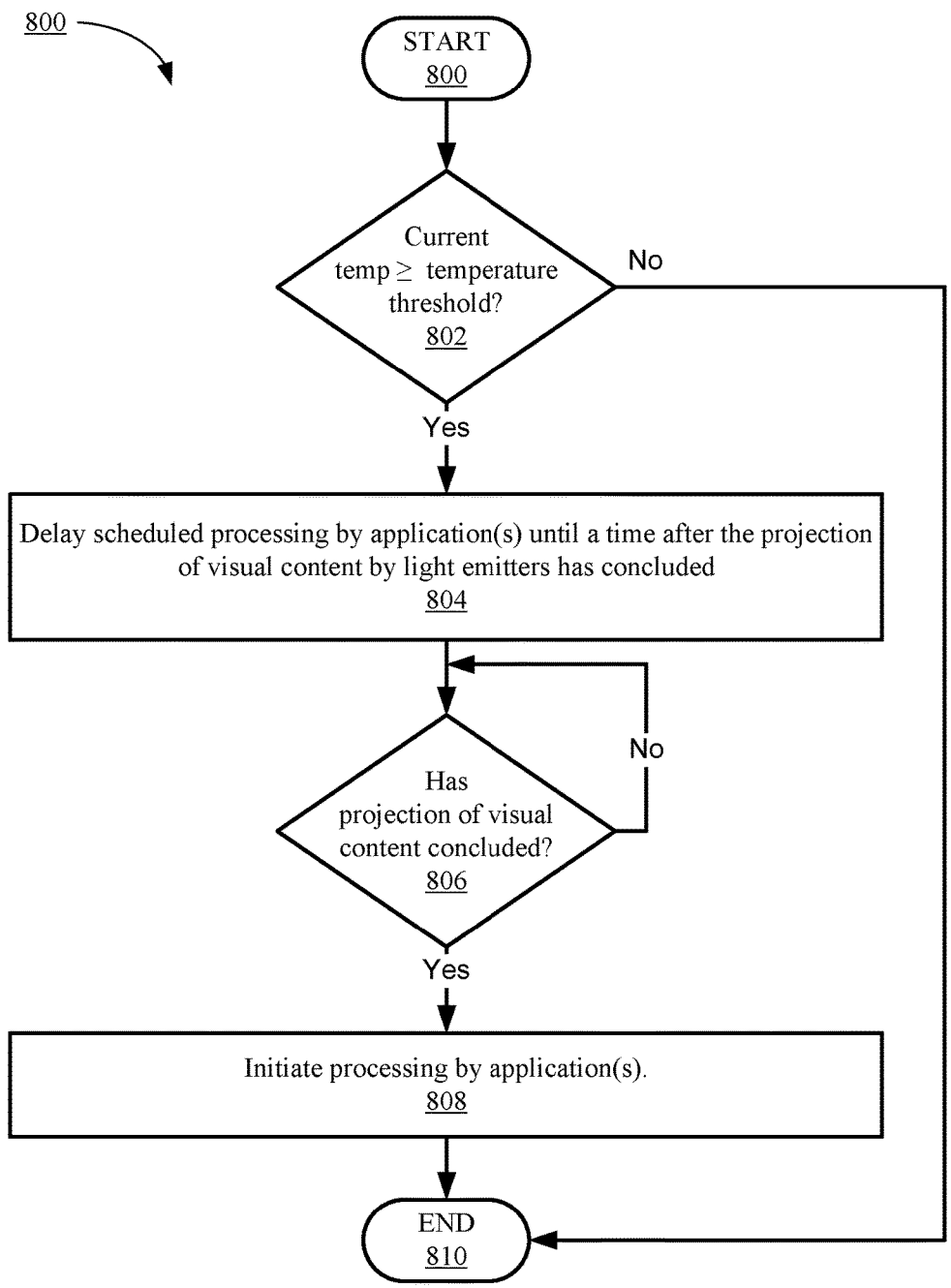
FIG. 8 is a flow chart illustrating a method for reducing heat generated during projection of visual content by delaying processing of at least one application during projection of a visual content by at least one light emitter, in accordance with one or more embodiments.

Referring now to FIG. 8, there is depicted a flow chart illustrating a method for reducing heat generated during projection of a visual content by delaying processing of at least one application during projection of visual content by at least one light emitter, in accordance with one or more embodiments of the present disclosure. Method 800 commences at initiator block 801 then proceeds to block 802. At block 802, CPU 104 determines whether a temperature (e.g., temperature 208*a-n*) of at least one emitter (e.g., light emitter(s) 147) meets or exceeds a temperature threshold (e.g., temperature threshold 210). In response to determining that the temperature does not meet or exceed the temperature threshold, method 800 ends at block 810. In response to determining that the temperature meets or exceeds a temperature threshold, CPU 104 delays a scheduled processing by at least one application (e.g., applications 118) until a time after the projection of the visual content has concluded (block 804). At block 806, CPU 104 determines whether the projection of the visual content has concluded. In response to reaching the conclusion of the projection of the visual content, CPU 104 initiates and/or resumes processing of the delayed application (block 808). Method 800 then ends at block 810.

In the above-described flow charts of FIG. 3-8, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
   determining a temperature of at least one light emitter of a projection device, wherein the at least one light emitter projects a visual content based on calibration data;
   determining, by a processor of an electronic device, whether the temperature exceeds a temperature threshold above which heat generated by one or more of light emitters and other components of electronic device may cause damage to, or shortening of an expected operational life of, at least one of the light emitter, the projection device, and the other components of the electronic device; and
   in response to determining the temperature exceeds the temperature threshold:
      calculating, by the processor, at least one adjustment that reduces a level of heat generated by the at least one light emitter during projection of the visual content, wherein the at least one adjustment overrides at least one portion of the calibration data;
      applying the at least one adjustment to the at least one light emitter; and
      modulating the at least one light emitter to project the visual content in accordance with the at least one adjustment and the calibration data.

2. The method of claim 1, wherein calculating the at least one adjustment further comprises the processor calculating at least one of:
   an adjustment to a refresh frequency of the at least one light emitter during projection of the visual content;
   an adjustment to a drive current applied to the at least one light emitter during projection of the visual content; and
   an adjustment to a pulse width applied to the at least one light emitter during projection of the visual content.

3. The method of claim 1, wherein the at least one light emitter comprises a plurality of light emitters, and wherein calculating the at least one adjustment further comprises:
   detecting, by at least one sensor, an amount of motion of at least one object within a current scene;
   determining, based on the detected amount of motion, at least one portion of the plurality of light emitters to illuminate during projection of the visual content; and
   establishing, as the at least one adjustment, an adjustment that illuminates only the at least one portion during projection of the visual content.

4. The method of claim 1, wherein calculating the at least one adjustment further comprises:
   detecting, by at least one sensor, a speed at which at least one object is moving within a current scene;
   determining, based on the detected speed, a modified projection frequency to apply to at least one portion of the at least one light emitter that illuminates the at least one object during projection of the visual content; and establishing, as the at least one adjustment, an adjustment that applies the modified projection frequency to the at least one portion of the at least one light emitter during projection of the visual content.

5. The method of claim 1, wherein calculating the at least one adjustment further comprises:

measuring, by at least one sensor, a level of ambient light within an environment of the electronic device;

determining, based on the measured level of ambient light, a modified level of drive current to be applied to at least one portion of the at least one light emitter during projection of the visual content; and establishing, as the at least one adjustment, an adjustment that applies the modified level of drive current to the at least one portion of the at least one light emitter during projection of the visual content.

6. The method of claim 1, wherein calculating the at least one adjustment further comprises:

measuring, by at least one sensor, a distance to at least one object within a current scene;

determining, based on the distance to the at least one object, a modified level of drive current to be applied to at least one portion of the at least one light emitter that illuminates the at least one object during projection of the visual content; and establishing, as the at least one adjustment, an adjustment that applies the modified level of drive current to the at least one portion of the at least one light emitter during projection of the visual content.

7. The method of claim 1, further comprising:

in response to determining the temperature exceeds the temperature threshold, delaying a scheduled processing of a plurality of images captured by at least one image sensor during projection of the visual content until a time after the projection of the visual content by the at least one light emitter has concluded; and in response to determining projection of the visual content has concluded, initiating processing of the plurality of images.

8. The method of claim 1, wherein calculating, by the processor, at least one adjustment comprises calculating the adjustment to modify an intensity of the light emitter based on temperature in order to reduce heat generated by the light emitters, wherein the calculated at least one adjustment mitigates negative effects caused by the heat generated by at least one of the light emitters and the projection device.

9. The method of claim 1, wherein calculating, by the processor, at least one adjustment comprises calculating an adjustment to reduce the temperature to a value that is below the temperature threshold to ensure that an operating temperature of at least one of the light emitter(s) and the projection device is within a predetermined safe thermal operating range.

10. An electronic device comprising:

a memory comprising calibration data;

a projection device having at least one light emitter that projects a visual content based on the calibration data;

at least one temperature sensor that measures a temperature of the at least one light emitter; and a processor that:

determines whether the temperature exceeds a temperature threshold above which heat generated by one or more of light emitters and other components of electronic device may cause damage to, or shortening of an expected operational life of, at least one of the light emitter, the projection device, and the other components of the electronic device; and in response to determining the temperature exceeds the temperature threshold:

calculates at least one adjustment that reduces a level of heat generated by the at least one light emitter during projection of the visual content, wherein the at least one adjustment overrides at least one portion of the calibration data;

applies the at least one adjustment to the at least one light emitter; and modulates the at least one light emitter to project the visual content in accordance with the at least one adjustment and the calibration data.

11. The electronic device of claim 10, wherein in calculating the at least one adjustment the processor calculates at least one of:

an adjustment to a refresh frequency of the at least one light emitter during projection of the visual content;

an adjustment to a drive current applied to the at least one light emitter during projection of the visual content; and an adjustment to a pulse width applied to the at least one light emitter during projection of the visual content.

12. The electronic device of claim 10, further comprising:

at least one sensor that is communicatively coupled to the processor and which: detects an amount of motion of at least one object within a current scene; and provides the detected amount of motion to the processor;

wherein:

the at least one light emitter comprises a plurality of light emitters, and in calculating the at least one adjustment the processor:

determines, based on the detected amount of motion, at least one portion of the plurality of light emitters to illuminate during projection of the visual content; and establishes, as the at least one adjustment, an adjustment that illuminates only the at least one portion during projection of the visual content.

13. The electronic device of claim 10, further comprising:

at least one sensor that detects a speed at which at least one object is moving within a current scene;

wherein in calculating the at least one adjustment the processor:

determines, based on the detected speed, a modified projection frequency to apply to at least one portion of the at least one light emitter that illuminates the at least one object during projection of the visual content; and establishes, as the at least one adjustment, an adjustment that applies the modified projection frequency to the at least one portion of the at least one light emitter during projection of the visual content.

14. The electronic device of claim 10, further comprising:

at least one sensor that measures a level of ambient light within an environment of the electronic device;

wherein in calculating the at least one adjustment the processor:

determines, based on the measured level of ambient light, a modified level of drive current to be applied to at least one portion of the at least one light emitter during projection of the visual content; and establishes, as the at least one adjustment, an adjustment that applies the modified level of drive current to the at least one portion of the at least one light emitter during projection of the visual content.

15. The electronic device of claim 10, further comprising:
at least one sensor that measures a distance to at least one object within a current scene;
wherein in calculating the at least one adjustment the processor:
   determines, based on the distance to the at least one object, a modified level of drive current to be applied to at least one portion of the at least one light emitter that illuminates the at least one object during projection of the visual content; and
   establishes, as the at least one adjustment, an adjustment that applies the modified level of drive current to the at least one portion of the at least one light emitter during projection of the visual content.

16. The electronic device of claim 10, further comprising:
at least one image sensor that captures a plurality of images within a current scene; and
a memory that stores the plurality of images;
wherein the processor:
   in response to determining the temperature exceeds the temperature threshold, delays a scheduled processing of a plurality of images captured by at least one image sensor during projection of the visual content until a time after the projection of the visual content by the at least one light emitter has concluded; and
   in response to determining projection of the visual content has concluded, initiates processing of the plurality of images.

17. A computer program product comprising:
a non-transitory computer readable storage device; and
program code on the computer readable storage device that, when executed by a processor associated with an electronic device, enables the electronic device to provide the functionality of:
   determining a temperature of at least one light emitter of a projection device, wherein the at least one light emitter projects a visual content based on calibration data;
   determining, by a processor, whether the temperature exceeds a temperature threshold above which heat generated by one or more of light emitters and other components of electronic device may cause damage to, or shortening of an expected operational life of, at least one of the light emitter, the projection device, and the other components of the electronic device; and
   in response to determining the temperature exceeds the temperature threshold:
      calculating, by the processor, at least one adjustment that reduces a level of heat generated by the at least one light emitter during projection of the visual content, wherein the at least one adjustment overrides at least one portion of the calibration data;
      applying the at least one adjustment to the at least one light emitter; and
      modulating the at least one light emitter to project the visual content in accordance with the at least one adjustment and the calibration data.

18. The computer program product of claim 17, the program code for calculating the at least one adjustment further comprising code for calculating at least one of:
   an adjustment to a refresh frequency of the at least one light emitter during projection of the visual content;
   an adjustment to a drive current applied to the at least one light emitter during projection of the visual content; and
   an adjustment to a pulse width applied to the at least one light emitter during projection of the visual content.

19. The computer program product of claim 17, wherein the at least one light emitter comprises a plurality of light emitters, the program code for calculating the at least one adjustment further comprising code for:
   detecting, by at least one sensor, an amount of motion of at least one object within a current scene;
   determining, based on the detected amount of motion, at least one portion of the plurality of light emitters to illuminate during projection of the visual content; and
   establishing, as the at least one adjustment, an adjustment that illuminates only the at least one portion during projection of the visual content.

20. The computer program product of claim 17, the program code for calculating the at least one adjustment further comprising code for:
   measuring, by at least one sensor, a level of ambient light within an environment of the electronic device;
   determining, based on the measured level of ambient light, a modified level of drive current to be applied to at least one portion of the at least one light emitter during projection of the visual content; and
   establishing, as the at least one adjustment, an adjustment that applies the modified level of drive current to the at least one portion of the at least one light emitter during projection of the visual content.

* * * * *